US010926231B2

(12) United States Patent
Amurri et al.

(10) Patent No.: US 10,926,231 B2
(45) Date of Patent: Feb. 23, 2021

(54) EXTRUSION DEVICE AND PROCESS FOR EXTRUDING A SEMI-FINISHED PRODUCT MADE OF ELASTOMERIC MATERIAL

(71) Applicant: Pirelli Tyre S.p.A., Milan (IT)

(72) Inventors: Cesare Emanuele Amurri, Milan (IT); Gaetano Lo Presti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 297 days.

(21) Appl. No.: 16/062,896

(22) PCT Filed: Dec. 22, 2016

(86) PCT No.: PCT/IB2016/057924
§ 371 (c)(1),
(2) Date: Jun. 15, 2018

(87) PCT Pub. No.: WO2017/109744
PCT Pub. Date: Jun. 29, 2017

(65) Prior Publication Data
US 2019/0001285 A1   Jan. 3, 2019

(30) Foreign Application Priority Data

Dec. 24, 2015   (IT) ............................ UB2015A009569

(51) Int. Cl.
*B29C 48/07*   (2019.01)
*B01F 7/00*   (2006.01)
(Continued)

(52) U.S. Cl.
CPC .... *B01F 7/00416* (2013.01); *B01F 15/00396* (2013.01); *B01F 15/0235* (2013.01);
(Continued)

(58) Field of Classification Search
CPC .................................................. B29C 48/07
(Continued)

(56) References Cited

U.S. PATENT DOCUMENTS 5,156,781 A   10/1992   Bohm et al.
5,267,847 A *  12/1993   Bohm .................. B29C 48/07
425/145
(Continued)

FOREIGN PATENT DOCUMENTS

DE   232 876 A1   2/1986
EP   0 443 143 A1   8/1991
(Continued)

OTHER PUBLICATIONS

Notification of the First Office Action from the China National Intellectual Property Administration in counterpart Chinese Application No. 201680080137, dated Mar. 3, 2020.
(Continued)

*Primary Examiner* — David L Sorkin
(74) *Attorney, Agent, or Firm* — Finnegan, Henderson, Farabow, Garrett & Dunner, L.L.P.

(57) ABSTRACT

The invention relates an extrusion device (100) for extruding a semi-finished product made of elastomeric material, comprising an extrusion body (10) extending along a feeding direction (A) and a pump (20) arranged downstream of the extrusion body (10) along said feeding direction (A). The extrusion body (10) comprises a hopper (30) for loading an elastomeric material and an extrusion screw (50) extending along said feeding direction (A) and having an inlet portion (50*a*) arranged close to the hopper (30) and an exit portion (50*b*) arranged close to the pump (20). The extrusion body (10) also comprises a motorised roller (40) arranged at the inlet portion (50*a*) of the extrusion screw (50) and configured to receive the elastomeric material from the hopper (30) and feed it to the extrusion screw (30). The extrusion screw (50) has a length and a diameter such that the ratio between length and diameter is comprised between 4 mm and 8 mm.
(Continued)

The invention also relates to an extrusion process carried out through the aforementioned extrusion device (100).

7 Claims, 2 Drawing Sheets

(51) Int. Cl.
*B29C 48/88* (2019.01)
*B29C 48/285* (2019.01)
*B29C 48/375* (2019.01)
*B29C 48/625* (2019.01)
*B01F 15/00* (2006.01)
*B01F 15/02* (2006.01)
*B01F 15/06* (2006.01)
*B29B 11/10* (2006.01)
*B29C 48/465* (2019.01)

(52) U.S. Cl.
CPC .......... *B01F 15/063* (2013.01); *B29B 11/10* (2013.01); *B29C 48/07* (2019.02); *B29C 48/2888* (2019.02); *B29C 48/387* (2019.02); *B29C 48/625* (2019.02); *B29C 48/914* (2019.02); *B01F 2015/061* (2013.01); *B01F 2215/0049* (2013.01); *B29C 48/467* (2019.02); *B29C 2948/924* (2019.02); *B29C 2948/926* (2019.02); *B29C 2948/92209* (2019.02); *B29C 2948/92704* (2019.02); *B29C 2948/92885* (2019.02)

(58) Field of Classification Search
USPC ..................................................... 366/76.5
See application file for complete search history.

(56) References Cited

U.S. PATENT DOCUMENTS

| | | | |
|---|---|---|---|
| 5,851,065 A * | 12/1998 | Ikeda | B29B 17/00 366/76.6 |
| 2008/0265456 A1 | 10/2008 | Ogawa et al. | |
| 2015/0086669 A1 | 3/2015 | Henke | |

FOREIGN PATENT DOCUMENTS

| | | |
|---|---|---|
| EP | 1 897 673 A1 | 3/2008 |
| FR | 2 644 100 A1 | 9/1990 |
| JP | 2001-150515 A | 6/2001 |
| JP | 2003-266523 | 9/2003 |
| SU | 1497030 A1 | 7/1989 |
| WO | WO 00/53390 A1 | 9/2000 |
| WO | WO 2012/001492 | 1/2012 |
| WO | WO 2014/000725 A2 | 1/2014 |

OTHER PUBLICATIONS

Office Action issued from the Brazilian Patent Office in counterpart Application No. BR112018012793 dated Apr. 7, 2020.
Lin Guangyi, et al., "Property Analysis on Feed Device of Rubber Cold Feed Extruder", *China Rubber/Plastics Technology and Equipment*, vol. 28, No. 7, pp. 7-9, Jul. 2002.
*Handbook of Rubber Industry*, Compilation Group of Handbook of Rubber Industry, pp. 125-126, vol. 7 (Book One), Chemical Industry Press, Nov. 1982.
International Search Report form the European Patent Office in corresponding International Application No. PCT/IB2016/057924 dated Apr. 19, 2017.
Written Opinion of the International Searching Authority from the European Patent Office in corresponding International Application No. PCT/IB2016/057924 dated Apr. 19, 2017.
Office Action from the Federal Service for Intellectual Property in a counterpart Russian Application No. 2018126870/05, dated Mar. 11, 2020.
Search Report from the Federal Service for Intellectual Property in a counterpart Russian Application No. 2018126870/05, dated Mar. 11, 2020.
Notification of the Third Office Action dated Dec. 9, 2020, from China National Intellectual Property Administration, in counterpart Chinese Application No. 201680080137.X.
Zhou, D. et al. "Polymer Material Molding and Processing", China Light Industry Press, pp. 321-322, May 2000.

* cited by examiner

EXTRUSION DEVICE AND PROCESS FOR EXTRUDING A SEMI-FINISHED PRODUCT MADE OF ELASTOMERIC MATERIAL

This application is a national phase application based on PCT/IB2016/057924, filed Dec. 22, 2016, and claims the priority of Italian Patent Application No. UB2015A009569, filed Dec. 24, 2015; the content of each application is incorporated herein by reference.

The present invention relates to an extrusion device for extruding a semi-finished product made of elastomeric material.

Preferably, the aforementioned device is used in a process for building a component made of elastomeric material of a tyre for vehicle wheels.

The invention also relates to an extrusion process which can be carried out through the aforementioned device.

The term "elastomeric material" is used to indicate a composition comprising at least one elastomeric polymer and at least one reinforcing filler. Preferably, such a composition also comprises additives like, for example, a cross-linking agent and/or a plasticizer. Thanks to the provision of the cross-linking agent, such a material can be cross-linked through heating, so as to form the final manufactured product.

The expression "semi-finished product made of elastomeric material" is used to indicate an elongated element obtained through an extrusion process configured to extrude the elastomeric material. Such a semi-finished product is thus made of only elastomeric material and has a flattened shape.

The expression "component made of elastomeric material" is used to indicate any component of the tyre, or a part thereof, obtained through the aforementioned semi-finished product.

A tyre for vehicle wheels generally comprises a carcass structure comprising at least one carcass ply formed of reinforcing cords incorporated in a matrix of elastomeric material. The carcass ply has end edges respectively engaged with annular anchoring structures. The latter are arranged in the areas of the tyre usually identified with the name "beads" and each of them is normally formed of a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre coming out from such a seat.

Specific reinforcing structures having the function of improving the torque transmission to the tyre can be provided at the beads.

A crown structure is associated in a radially outer position with respect to the carcass structure.

The crown structure comprises a belt structure and, in a radially outer position with respect to the belt structure, a tread band made of elastomeric material.

The belt structure comprises one or more belt layers arranged radially one on top of the other and having textile or metallic reinforcing cords with a crossed orientation and/or an orientation substantially parallel to the direction of circumferential extension of the tyre.

A layer of elastomeric material, called "under-belt", can be provided between the carcass structure and the belt structure, said layer having the function of making the radially outer surface of the carcass structure as uniform as possible for the subsequent application of the belt structure.

A so-called "under-layer" can be arranged between the belt structure and the tread band, the under-layer being made of an elastomeric material having properties suitable for ensuring a steady union of the tread band to the belt structure.

In the case of tubeless tyres, a layer of elastomeric material, generally known as "liner", can also be provided in a radially inner position with respect to the carcass structure to provide the necessary impermeability to the inflation air of the tyre.

Respective sidewalls made of elastomeric material are applied on the side surfaces of the carcass structure, each sidewall extending from one of the side edges of the tread band up to the respective bead annular anchoring structure.

A tyre for vehicle wheels thus comprises a plurality of components made of elastomeric material, in accordance with the definition given above. Among them it is possible to identify, as non-limiting examples: the tread band, the sidewalls, the so-called under-belts and/or under-layers, the liner, etc.

The aforementioned components can be made from semi-finished products made of elastomeric material obtained through an extrusion process carried out in an extrusion device. The extruded semi-finished product is then deposited on a forming support which can rotate about a rotation axis. The deposition of the semi-finished product can be made in different ways (for example according to adjacent and/or at least partially overlapping coils) depending on the component to be made.

WO 2012/001492 describes an extrusion device for extruding a semi-finished product made of elastomeric material used for building tyres.

Such an extrusion device comprises four different structural units. A first structural unit is defined by an extrusion body comprising, at an upstream end portion thereof, a hopper for loading the elastomeric material to be extruded. A second structural unit is defined by an extrusion screw mounted inside the extrusion body and configured to rotate in order to move the elastomeric material from the upstream end portion to a downstream end portion of the extrusion body. A third structural unit is defined by a gear pump operatively associated with the extrusion body at the downstream end portion thereof. Such a gear pump receives the elastomeric material moved by the extrusion screw and pushes it under pressure downstream, with reference to the direction of movement of the elastomeric material. A fourth structural unit is defined by a nozzle associated with the gear pump, downstream thereof, again with reference to the direction of movement of the elastomeric material. The elastomeric material pushed by the gear pump is drawn in the form of extruded semi-finished product through such a nozzle to then be deposited on a forming support.

The Applicant has observed that in extrusion processes used for building components of tyres for vehicle wheels, it is important to ensure both a high flow rate, in order to achieve a high production capacity of the line, and a continuity and consistency of the flow rate coming out from the extrusion body, in order to avoid having defects and/or structural discontinuities in the extruded semi-finished product (and therefore in the tyre). In order to ensure the desired continuity and consistency of flow rate it is necessary to have a continuous filling of the extrusion body by the elastomeric material during the extrusion and this is obtained by adjusting the rotation speed of the extrusion screw so as to keep the pressure value upstream of the gear pump constant.

The Applicant has also observed that in processes for building some types of tyres for vehicle wheels there is a need to use "soft" elastomeric materials, for example materials having low viscosity and/or a high content of plasticizers (such as oils and/or resins). This happens for example in the building of tread bands for high and ultra-high performance tyres, commonly defined as "HP" (High Performance) or "UHP" (Ultra High Performance) tyres, or in the building of the tread bands of winter tyres.

The Applicant has found that the use of such materials can result in some drawbacks.

The Applicant has at first observed that, since the extrusion screw is typically short in length (in order to limit the bulk, as discussed below), the low viscosity of the elastomeric material causes a reduction of the pressure gradient that the extrusion screw is capable of generating in order to keep the pressure value upstream of the gear pump substantially constant.

The Applicant has also observed that the viscosity of the elastomeric material tends to reduce when the temperature increases. Therefore, at higher flow rates the extrusion screw is forced to rotate faster, thus heating the elastomeric material and further reducing its viscosity.

Wishing to keep a substantially constant pressure value upstream of the gear pump even after the increase in speed of the extrusion screw and the consequent decrease in viscosity of the elastomeric material, a greater filling of the extrusion screw occurs to compensate the reduced pressure gradient in the axial direction.

When the filling is such that the elastomeric material reaches the loading hopper, the elastomeric material no longer has the possibility of entering into the extrusion body. In this case the rotation of the extrusion screw can cause the elastomeric material filled in to be sliced and the flow of filled in elastomeric material to be stopped. This causes an increase in the rotation speed of the extrusion screw and a rapid emptying of the extrusion body, until the maximum rotation speed set is reached and the extrusion device is stopped, with consequent production of material waste. The stop of the extrusion device is caused by the fact that, once the maximum rotation speed is reached, the extrusion screw no longer can ensure the aforementioned pressure value and reaches the minimum feeding pressure, which indeed generates the stop of the extrusion device.

The Applicant has noted that the drawbacks discussed above also (and/or even more) occur due to the fact that the extrusion processes typically used in building of tyres for vehicle wheels are discontinuous, i.e. there are waiting times between a dispensing operation and another dispensing operation. Such waiting times, which can also be of some minutes, cause an excessive stay of the elastomeric material inside the extrusion body, with consequent excessive overheating of the layer of elastomeric material in contact with the hot walls of the extrusion body. The more the elastomeric material overheats and softens the more its adhesion to the hot walls of the extrusion body increases, with the negative consequences described above.

The Applicant has also noted that the increase in temperature of the elastomeric material, as a consequence of the increase in rotation speed of the extrusion screw, can cause the formation of bubbles in the semi-finished product made of elastomeric material and, consequently, lead to defects in the built and vulcanised tyre.

The Applicant has also observed that, in production plants characterised by high flexibility and production rate, there is a tendency to multiply the number of devices (also including the extrusion devices) and of apparatuses provided in the plant, often with no possibility of increasing the installation space of such devices/apparatuses or with no possibility of modifying the layout of the plant.

The Applicant has therefore felt the need to have devices and apparatuses that are as compact as possible. In the specific case of extrusion devices, such compactness can be obtained using extrusion screws having, the diameter and therefore the desired flow rate being equal, a length that is as short as possible.

Moreover, the Applicant has observed that the sizing of the extrusion device typically is made taking into account a number of parameters, including the pressure value upstream of the gear pump and a pressure value substantially equal to zero at the hopper. Such aspects normally lead to the use of sufficiently long extrusion screws. Such a need is even greater when the aforementioned elastomeric materials with low viscosity are used.

The Applicant has perceived that it is possible to reduce the length of the extrusion device, the diameter and the required flow rate being equal, without encountering the problems discussed above by providing in the extrusion body, upstream of the extrusion screw, a device dedicated to receive the elastomeric material from the hopper and to feed it to the extrusion screw.

The Applicant has finally found that, by carrying out a forced feeding of the elastomeric material to the extrusion screw and at the same time setting an appropriate variation range for the extrusion screw length to diameter ratio, it is possible to obtain the desired continuity and consistency of flow rate as well as reducing the bulk of the extrusion screw without compromising the productivity of the extrusion process.

The present invention therefore relates, in a first aspect thereof, to an extrusion device for extruding a semi-finished product made of elastomeric material.

Preferably, the extrusion device comprises an extrusion body extending along a feeding direction.

Preferably, the extrusion device comprises a pump arranged downstream of said extrusion body along said feeding direction.

Preferably, the extrusion body comprises a hopper for loading an elastomeric material.

Preferably, the extrusion body comprises an extrusion screw extending along said feeding direction and having an inlet portion arranged close to said hopper and an exit portion arranged close to said pump.

Preferably, the extrusion body comprises a motorised roller arranged at the inlet portion of said extrusion screw and configured to receive said elastomeric material from said hopper and feed it to said extrusion screw.

Preferably, said extrusion screw has a length and a diameter such that the ratio between length and diameter is comprised between 4 and 8.

According to the Applicant, the motorised roller facilitates the movement of the elastomeric material inside the extrusion body towards the extrusion screw, counteracting the tendency of the elastomeric material to adhere to the hot walls of the extrusion body. In practice, the motorised roller operates as if it were a mobile wall that, pushing the elastomeric material towards the extrusion screw, prevents such a material from adhering on the hot walls of the extrusion body, thus avoiding all of the problems discussed above to occur. Such a provision makes it possible to use extrusion screws of shorter length, allowing the extrusion device to be sufficiently compact to be used in plants in which the space for the installation of such a device is limited.

The Applicant has verified that, despite the provision of an extrusion screw of shorter length, thanks to the forced feeding carried out by the motorised roller it is possible to ensure the desired continuity and consistency of flow rate (also at high flow rates) and the desired pressure gradient in the extrusion body even when elastomeric materials having a low viscosity are used and in the case of discontinuous dispensing operation.

In a second aspect thereof, the invention relates to a process for extruding a semi-finished product made of elastomeric material.

Preferably, a forced feeding of an elastomeric material to an extrusion screw along a feeding direction is provided.

Preferably, said elastomeric material is moved through said extrusion screw along said feeding direction.

Preferably, said extrusion screw has a length and a diameter such that the ratio between length and diameter is comprised between 4 and 8.

The Applicant believes that the process described above, being able to be carried out by the extrusion device of the present invention, allows the advantageous effects described above with reference to the extrusion device to be obtained.

The present invention, in at least one of the aforementioned aspects, can have at least one of the following preferred characteristics, taken individually or in combination with any of the other preferred characteristics described herein.

Preferably, said pump is a gear pump.

Preferably, said ratio is equal to about 6. The Applicant has verified that such a value defines a structural configuration of the extrusion screw which us suitable for allowing an optimal compromise between compactness of the extrusion device and production capacity thereof.

Preferably, the length of the extrusion screw is comprised between 500 mm and 1500 mm.

Preferably, a cooling unit for cooling said motorised roller is provided. Such a provision prevents the elastomeric material from sticking to the motorised roller and, by doing so, causing the desired continuity and consistency of flow rate not to be obtained.

Preferably, the motorised roller is driven in rotation by a motor group distinct from the one that drives in rotation said extrusion screw. In this way it is possible to drive the motorised roller at a different rotation speed from that of the screw. In particular, the Applicant has found that it is advantageous to drive the motorised roller at a rotation speed lower than that of the extrusion screw. In this way, the amount of waste elastomeric material generated at the motorised roller is reduced, and consequently the burden of periodic cleaning the discharge area of such waste elastomeric material is reduced as well. In this respect, the Applicant has noted that the elastomeric material tends to remain attached to the member having the fastest peripheral speed. In the present invention, therefore, the lower peripheral speed of the motorised roller with respect to the extrusion screw ensures that the elastomeric material tends to adhere to the extrusion screw.

Preferably, a first heat-control unit associated with said extrusion body at said hopper is provided and a second heat-control unit associated with said extrusion body at said extrusion screw is provided. In this way it is possible to keep the area of the extrusion body upstream of the extrusion screw at a (sufficiently low) temperature such as to prevent the elastomeric material to adhere to the walls of the extrusion body. Such a provision is particularly advantageous in the case in which the elastomeric material has a low viscosity and/or in the case in which the extrusion device operates discontinuously.

Preferably, the exit portion of said extrusion screw comprises a pointed end portion provided with at least one thread. This allows the extrusion screw to exert its pushing action on the elastomeric material also at the end point thereof, in practice thus behaving like an extrusion screw of longer length. In this way it is possible to ensure that the pressure value of the elastomeric material upstream of the pump is greater, the pressure at the hopper being equal, in this way contributing to obtain the desired continuity and consistency of flow rate.

Preferably, providing said forced feeding comprises feeding said elastomeric material to said extrusion screw through a motorised roller.

Preferably, said motorised roller is made to rotate at a peripheral speed lower than that of said extrusion screw.

Preferably, said motorised roller is cooled through a cooling fluid.

Preferably, the temperature at said motorised roller is adjusted to a value lower than that at said extrusion screw.

Preferably, said elastomeric material is fed with a flow rate comprised between about 25 cc/s and about 45 cc/s.

Further characteristics and advantages of the present invention will become clearer from the following detailed description of a preferred embodiment thereof, made with reference to the attached drawings. In such drawings.

Figure 1:
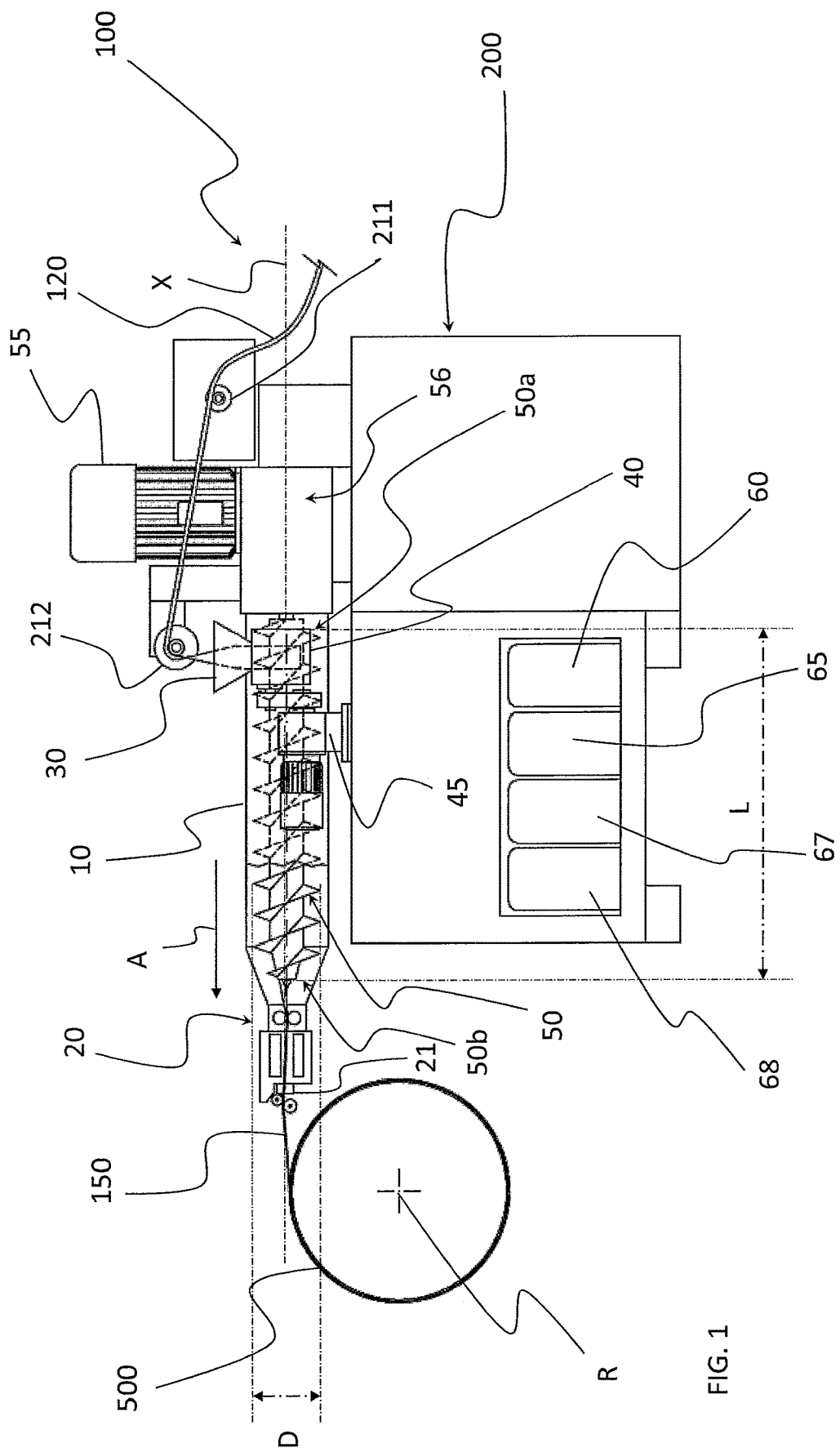
FIG. 1 is a schematic view of a longitudinal section of a preferred embodiment of an extrusion device in accordance with the present invention.

In FIG. 1, reference numeral 100 indicates an extrusion device in accordance with the present invention.

The extrusion device 100 is used in a process for building tyres for vehicle wheels in order to make a component of the tyre made of elastomeric material. Such a component can for example be the tread band, the sidewall, the so-called under-belt and/or under-layer, the liner, etc.

The aforementioned component is obtained by depositing a semi-finished product 150 made of elastomeric material on a forming support 500 which can rotate about a rotation axis R.

Once deposition is complete, the forming support 500 is moved away from the extrusion device 100 leaving space for a new forming support in order to make a component made of elastomeric material of another tyre.

Preferably, the extrusion device 100 is used to make the tread band of "HP" or "UHP" tyres or of winter tyres.

The semi-finished product 150 deposited on the forming support 500 is obtained by extrusion in the extrusion device 100 of an elongated element 120 made of elastomeric material.

The extrusion device 100 comprises an extrusion body 10 defined by a substantially cylindrical hollow body having a longitudinal axis X.

The extrusion body 10 is mounted on a support block 200 that is located in a position adjacent to that taken up by the forming support 500 on which the semi-finished product 150 is deposited.

The elongated element 120 is fed to the extrusion body 10 through at least one feeding roller 211 and at least one moving roller 212 mounted on the support block 200 upstream of the extrusion body 10, i.e. on the opposite side with respect to the forming support 500.

The extrusion body comprises an extrusion screw 50 extending along the longitudinal axis X and configured to move the elongated element 120 inside the extrusion body 10 along a feeding direction A parallel to the longitudinal axis X.

The extrusion screw 50 comprises opposite end portions 50a, 50b, namely an inlet portion and an exit portion, respectively.

Figure 2:
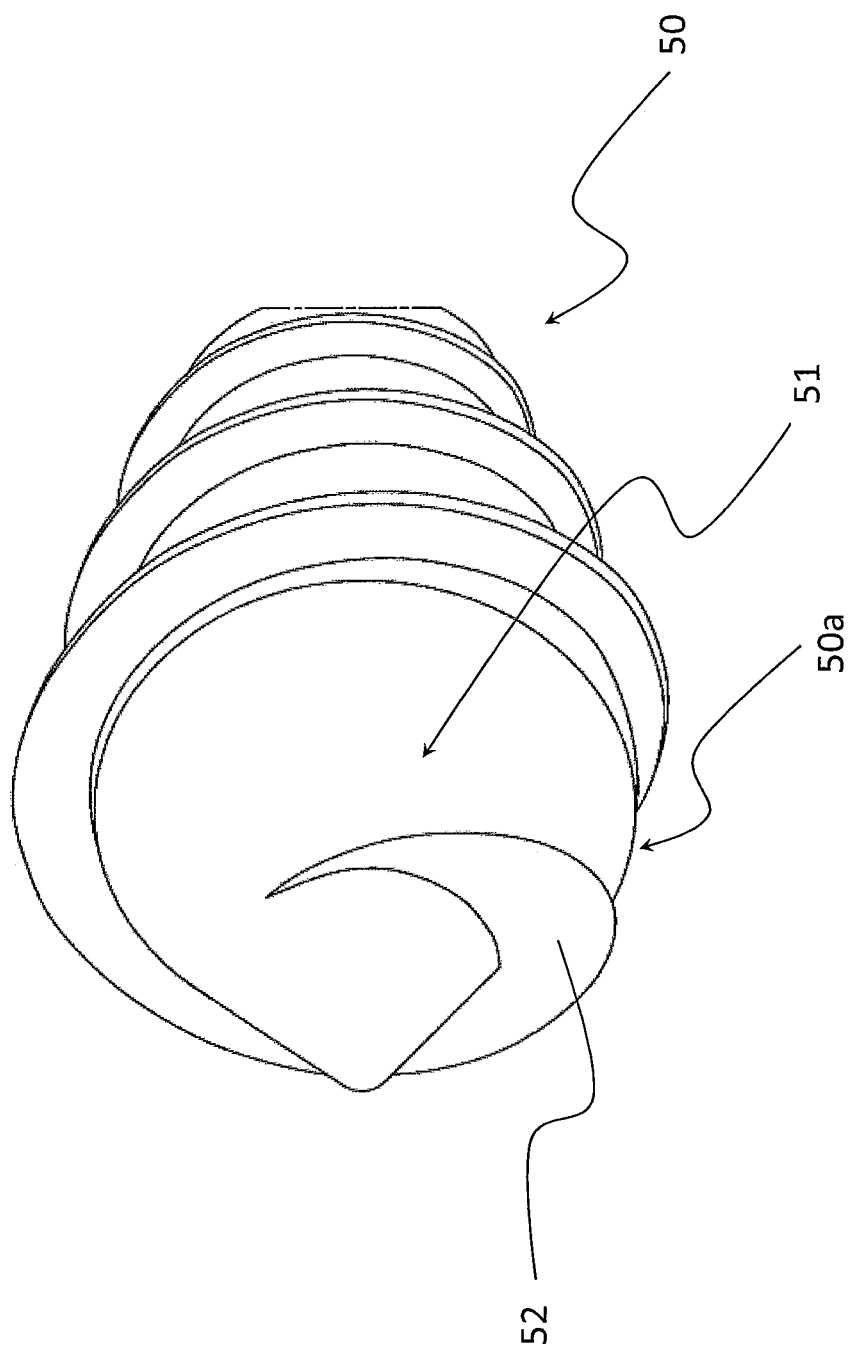
FIG. 2 is an enlarged perspective view of a detail of the extrusion device of FIG. 1.

As shown in FIG. 2, the exit portion 50b of the extrusion screw 50 comprises a pointed end portion 51 provided with a thread 52. In particular, the thread 52 is an extension of the thread provided on the remaining portion of the extrusion screw 50. In this way, the threaded portion of the extrusion screw 50 has a length greater than that of a conventional extrusion screw, which unlike the extrusion screw 50 has a pointed end portion without threads.

With reference to FIG. 1, the extrusion screw 50 has a length L greater than 500 mm, preferably greater than 700 mm.

The extrusion screw 50 has a length L lower than 1500 mm, preferably lower than 1300 mm.

In the preferred embodiment of the present invention, the length L of the extrusion screw 50 is comprised between 500 mm and 1500 mm, more preferably between 700 mm and 1300 mm.

The extrusion screw 50 has a diameter D lower than 250 mm, preferably lower than 220 mm, more preferably lower than 190 mm.

The extrusion screw 50 has a diameter D greater than 100 mm, preferably greater than 120 mm, more preferably greater than 170 mm.

In the preferred embodiment of the present invention, the diameter D of the extrusion screw 50 is comprised between 100 mm and 250 mm, more preferably between 120 mm and 220 mm, even more preferably between about 170 mm and about 190 mm.

The ratio between length L and diameter D of the extrusion screw is comprised between 4 and 8, preferably between 5 and 7, for example equal to about 6.

The extrusion screw 50 is driven in rotation by a motor group 55.

For example, like in the exemplifying embodiment shown in FIG. 1, the motor group 55 is mounted on the support block 200 upstream of the extrusion body 10 and provides the rotation motion to the extrusion screw 50 through a reduction gear 56 also arranged upstream of the extrusion body 50.

The extrusion body 10 comprises, at the inlet portion 50a of the extrusion screw 50, a hopper 30 for loading the elongated element 120 coming from the rollers 211, 212.

Again at the inlet portion 50a of the extrusion screw 50, and downstream of the hopper with reference to the path followed by the elongated element 120, the extrusion body 10 comprises a motorised roller 40 configured to receive the elongated element 120 coming from the hopper 30 and feed it to the extrusion screw 50 along a feeding direction A parallel to the longitudinal axis X.

The motorised roller 40 can be arranged under the hopper 30 and on a side of the inlet portion 50a of the extrusion screw 50, i.e. not aligned with the extrusion screw 50. Alternatively, the motorised roller 40 can be arranged upstream of the inlet portion 50a of the extrusion screw 50, under the hopper 30 and aligned with the extrusion screw 50.

Preferably, the extrusion device 100 also comprises a cooling unit for cooling the motorised roller 40. Such a cooling unit can be one of the heat-control units 60, 65, 67, 68 discussed below. Alternatively, the motorised roller 40 can be cooled with a direct flow of water adjusted through a thermostatic valve.

The motorised roller 40 is driven in rotation by a motor group 45 distinct from the motor group 55 that moves the extrusion screw 50.

For example, like in the exemplifying embodiment shown in FIG. 1, the motor group 45 is mounted on the support block 200 on a side of the extrusion body 10 and provides the rotation motion to the motorised roller 40 through a reduction gear or a (belt or chain) transmission system, not visible in the attached figures.

The provision of distinct motor groups for the extrusion screw 50 and the motorised roller 40 makes it possible to drive in rotation the motorised roller 40 at a different rotation speed from that of the extrusion screw 50. Preferably, the rotation speed of the motorised roller 40 is lower than that of the extrusion screw 50.

In the preferred embodiments of the invention, the ratio between rotation speed of the motorised roller 40 and rotation speed of the extrusion screw 50 is comprised between about 0.2 and about 0.8.

The extrusion device 10 comprises, downstream of the extrusion body 10, i.e. close to the exit portion 50b of the extrusion screw 50, a pump 20, preferably of the gear type, through which the elastomeric material exiting from the extrusion body 10 passes.

In the example embodiment shown in FIG. 1, a nozzle 21 is associated with the pump 20 on the opposite side to the extrusion body 10. The elastomeric material pushed by the pump 21 is drawn through such a nozzle 21 to form a semi-finished product 150 having the desired shape and size, which is then deposited on the forming support 500.

In an alternative embodiment (not shown) of the extrusion device 100 of the present invention, as member for drawing the elastomeric material, instead of the nozzle 21, it is possible to use a different device suitable for giving the semi-finished product 150 the desired shape and size (for example a pair of calendar rollers).

The extrusion device 100 also comprises a plurality of heat-control units each intended to adjust the temperature at a specific area of the extrusion device 100.

In particular, a heat-control unit 60 associated with the extrusion body 10 at the hopper 30 is provided and a heat-control unit 65 associated with the extrusion body 10 at the extrusion screw 50 is provided, so as to be able to keep the area of the extrusion body 10 upstream of the extrusion screw 50 at a temperature lower than that of the area of the extrusion body 10 in which the extrusion screw 50 is provided. Such a provision is particularly useful in the case in which elastomeric materials with low viscosity are used.

In this case, for example, the area of the extrusion body 10 at the hopper 30 is kept at a temperature comprised between about 25° C. and about 30° C., whereas the area of the extrusion body at the extrusion screw is kept at a temperature comprised between about 50° C. and about 90° C.

In the exemplifying embodiment shown in FIG. 1, a heat-control unit 67 associated with the pump 20 and a heat-control unit 68 associated with the nozzle 21 are also provided. Downstream of the nozzle there a conveyor belt can be provided; in this case, a heat control of the nozzle 21 is not necessary.

The heat-control units are controlled by an electric panel (not shown) also provided on the support block 200.

Advantageously, the provision of the electric panel and of the heat-control units 60, 65, 67 and 68 on the support block 200 allows that in order to activate the extrusion device 100 it is necessary to simply connect it to the electrical power network and to the air and water feeding circuits.

With the extrusion device 100 described above, it is possible to set at the outlet of the extrusion body 10 and upstream of the pump 20 pressure values comprised between about 30 bar and about 80 bar, preferably equal to about 50 bar. This makes it possible to ensure the desired consistency of flow rate for feeding flow rates comprised between about 25 cc/sec and about 45 cc/sec, even in the case of use of elastomeric materials with low viscosity and in the case of discontinuous extrusion processes.

A preferred embodiment of an extrusion process for extruding a semi-finished product made of elastomeric material is now described. In particular this process can be carried out by the extrusion device 100 described above to make a component made of elastomeric material of a tyre for vehicle wheels.

Once the forming support 500 has been positioned close to the extrusion device 100, the motor groups 45 and 55 are activated, thus driving the motorised roller 40 and the extrusion screw 50 in rotation at the desired rotation speed. In particular, the motorised roller 40 is preferably driven at a rotation speed lower than that of the extrusion screw 50.

The heat-control units 60, 65, 67 and 68 are also activated, by adjusting the temperature of the various areas of the extrusion device 100 to the desired values. In particular, the area of the extrusion body 10 upstream of the extrusion screw 50 is brought and kept to a temperature lower than that of the area of the extrusion body 10 in which the extrusion screw 50 is provided.

The elongated element 120 is taken from a collection bench and arranged manually on the rollers 211, 212, which are moved to bring the elongated element 120 inside the hopper 30.

The elongated element 120 passes from the hopper 30 to the motorised roller 40 and from the latter is forcibly fed to the extrusion screw 50 and then to the pump 20 proceeding along the feeding direction A.

During the feeding of the elongated element 120 towards the extrusion screw 50 the motorised roller 40 is cooled through a cooling fluid, preferably water.

The elastomeric material coming out from the pump 20 passes through the nozzle 21 and is drawn to form the semi-finished product 150, which is deposited on the forming support 500.

Once the deposition of the semi-finished product 150 on the forming support 500 is complete, the extrusion device 100 is deactivated, thus interrupting the extrusion process, and the forming support 500 is picked up and taken away from the extrusion device 100 to proceed with the subsequent tyre building steps.

The extrusion process can start again, repeating the operations described above identically, following the positioning of a new forming support in the position previously occupied by the forming support 500, so as to build a component made of elastomeric material of another tyre also on this new forming support through deposition on such a forming support of the semi-finished product 120 obtained through the extrusion device 100.

The present invention has been described with reference to some preferred embodiments. Different changes can be made to the embodiments described above, still remaining within the scope of protection of the invention, defined by the following claims.

The invention claimed is:

1. An extrusion device, comprising:
    an extrusion body extending along a feeding direction; and
    a pump arranged downstream of the extrusion body along the feeding direction;
    wherein the extrusion body comprises:
        a hopper for loading an elastomeric material,
        an extrusion screw extending along the feeding direction and having an inlet portion arranged close to the hopper and an exit portion arranged close to the pump, and
        a motorised roller arranged at the inlet portion of the extrusion screw, aligned with the extrusion screw along the feeding direction, and configured to receive the elastomeric material from the hopper and feed it to the extrusion screw, wherein the extrusion screw has a length and a diameter such that a ratio between the length and the diameter is comprised between 4 and 8.

2. The extrusion device according to claim 1, wherein the pump is a gear pump.

3. The extrusion device according to claim 2, further comprising a cooling unit for cooling the motorised roller.

4. The extrusion device according to claim 3, wherein the motorised roller is driven in rotation by a first motor group distinct from a second motor group that drives in rotation the extrusion screw.

5. The extrusion device according to claim 4, further comprising a first heat-control unit associated with the extrusion body at the hopper and a second heat-control unit associated with the extrusion body at the extrusion screw.

6. The extrusion device according to claim 5, wherein the exit portion of the extrusion screw comprises a pointed end portion provided with at least one thread.

7. The extrusion device according to claim 6, wherein the length has a value comprised between about 500 mm and about 1500 mm.

* * * * *